US008927882B2

(12) United States Patent  (10) Patent No.: US 8,927,882 B2
Teraoka  (45) Date of Patent: Jan. 6, 2015

(54) COMMODITY SEARCH DEVICE THAT IDENTIFIES A COMMODITY BASED ON THE AVERAGE UNIT WEIGHT OF A NUMBER OF COMMODITIES RESTING ON A SCALE FALLING WITHIN A PREDETERMINED WEIGHT DEVIATION OF A REFERECE UNIT WEIGHT STORED IN A DATABASE

(75) Inventor: Kazuharu Teraoka, Tokyo (JP)

(73) Assignee: Teraoka Seiko Co. Ltd., Tokyo (JP)

( * ) Notice: Subject to any disclaimer, the term of this patent is extended or adjusted under 35 U.S.C. 154(b) by 395 days.

(21) Appl. No.: 13/489,059

(22) Filed: Jun. 5, 2012

(65) Prior Publication Data

US 2012/0312605 A1    Dec. 13, 2012

(30) Foreign Application Priority Data

Jun. 7, 2011    (JP) .................................. 2011-127295

(51) Int. Cl.
*G01G 21/23*    (2006.01)
*G07G 1/00*    (2006.01)
*G01G 19/414*    (2006.01)

(52) U.S. Cl.
CPC .......... *G07G 1/0072* (2013.01); *G01G 19/4144* (2013.01); *G07G 1/0063* (2013.01)
USPC .................. 177/25.13; 177/25.14; 177/25.15; 702/179; 705/23; 235/383; 235/385

(58) Field of Classification Search
USPC .......................... 705/23; 235/383, 385; 177/1, 177/25.11–25.19; 702/179
See application file for complete search history.

(56) References Cited

U.S. PATENT DOCUMENTS

| 4,447,885 A | * | 5/1984 | Biss | ............................... | 702/129 |
|---|---|---|---|---|---|
| 4,891,755 A | * | 1/1990 | Asher | ............................... | 705/28 |
| 5,497,314 A | * | 3/1996 | Novak | ............................... | 705/17 |
| 5,937,386 A | * | 8/1999 | Frantz | ............................... | 705/15 |
| 6,363,366 B1 | | 3/2002 | Henty | | |
| 6,471,125 B1 | * | 10/2002 | Addy | ............................... | 235/385 |
| 6,606,579 B1 | | 8/2003 | Gu | | |

(Continued)

FOREIGN PATENT DOCUMENTS

| EP | 0685814 A2 | 6/1995 |
|---|---|---|
| EP | 0685814 A2 | 12/1995 |
| JP | 2595427 | 4/1997 |
| JP | 4024924 | 12/2007 |

OTHER PUBLICATIONS

European Search Report issued Oct. 9, 2012 for corresponding European Appln. No. 12170520.6-1238.

*Primary Examiner* — Randy W Gibson
(74) *Attorney, Agent, or Firm* — K&L Gates LLP

(57) ABSTRACT

A commodity search device includes a storage unit, a measuring unit, a number input unit, a unit average weighing value calculator, and a first commodity search unit. The storage unit stores commodity information including a reference unit weight determined for each commodity. The measuring unit measures a total weight of commodities placed at a predetermined weighing position. The number input unit allows inputting the number of the weighed commodities. The unit average weighing value calculator divides the total weight of the commodities weighed by the measuring unit by the number input by the number input unit to calculate a unit average weighing value per one commodity. The first commodity search unit searches for commodities falling within a weight deviation from the storage unit using the unit average weighing value.

7 Claims, 11 Drawing Sheets

(56) References Cited

U.S. PATENT DOCUMENTS

| | | | |
|---|---|---|---|
| 7,118,026 B2 * | 10/2006 | Harris et al. | 235/375 |
| 7,589,287 B1 * | 9/2009 | Hargabus | 177/25.13 |
| 7,841,522 B2 * | 11/2010 | Fortenberry | 235/383 |
| 8,286,868 B2 * | 10/2012 | Edwards | 235/383 |
| 8,513,544 B2 * | 8/2013 | Eckerdt | 177/25.19 |
| 2004/0262391 A1 * | 12/2004 | Harris et al. | 235/454 |
| 2012/0043139 A1 * | 2/2012 | Eckerdt | 177/1 |
| 2013/0175099 A1 * | 7/2013 | Tazawa | 177/25.13 |

\* cited by examiner

FIG. 6

| PLU CODE | COMMODITY NAME | UNIT PRICE (YEN) | SALE UNIT | REFERENCE UNIT WEIGHT (g) | ICON DISPLAY DATA | CAPTURED IMAGE COMPARISON DATA |
|---|---|---|---|---|---|---|
| .... | .... | .... | .... | .... | .... | .... |
| 020 | APPLE | 120 | NUMBER | 350 | ..... | ..... |
| ..... | ..... | ..... | ..... | ..... | ..... | ..... |
| 064 | MINCED MEAT | 200 | WEIGHT | ---- | ..... | ..... |
| ..... | ..... | ..... | ..... | ..... | ..... | ..... |
| 100 | PEAR | 150 | NUMBER | 400 | ..... | ..... |
| ........ | ........ | ........ | ........ | ........ | ........ | ........ |

121

COMMODITY SEARCH DEVICE THAT IDENTIFIES A COMMODITY BASED ON THE AVERAGE UNIT WEIGHT OF A NUMBER OF COMMODITIES RESTING ON A SCALE FALLING WITHIN A PREDETERMINED WEIGHT DEVIATION OF A REFERECE UNIT WEIGHT STORED IN A DATABASE

BACKGROUND OF THE INVENTION

1. Field of the Invention

The present invention relates to technology for specifying commodities such as fruits and vegetables or side dishes provided by so-called individual sale, such as "number-based sale" or "weight-based sale," without being pre-packaged in a pricing process or an accounting process.

Priority is claimed on Japanese Patent Application No. 2011-127295, filed Jun. 7, 2011, the content of which is incorporated herein by reference.

2. Description of Related Art

Individual sale commodities have been increasing at food retailers, such as supermarkets according to requests to reduce packaging materials or individual needs of consumers. However, in individual sale, it is difficult to attach a barcode or an RFID tag to a commodity to specify the commodity. Thus, specifying of commodities necessary when a commodity information-processing device (which refers to a POS register, a face-to-face weighing device, a self-service scale, or a pricing machine in the present application) performs a pricing process, an accounting process or the like is difficult. In particular, when there are tens of types of commodities in an individual sale form, a risk of an accounting mistake due to a difference in commodities increases.

Japanese Patent No. 2595427 discloses a system for specifying a commodity by recognizing a color or a shape of the commodity using a camera. Also, Japanese Patent No. 4024924 discloses a device for specifying a commodity using a weight of the commodity, although not necessarily directed to use by food retailers.

However, in the device disclosed in Japanese Patent No. 2595427, if a purchase quantity is changed each time as in an individual sale form and a commodity is received in a plastic bag by a customer when the commodity is specified, there is a disadvantage in that accuracy of the search is degraded because the search is performed only through a comparison between data captured when the commodity is specified and captured commodity image comparison data (optical characteristic data) prepared in a commodity database in advance.

Further, the device of Japanese Patent No. 4024924 is intended to be used for commodity classification, and a set weight value stored in a commodity information storage unit is set on the premise that the weight or the number of a weighed commodity is determined in advance. Meanwhile, in the individual sale, since the number or the weight of commodities purchased by the customer varies each time, a simple comparison between the sale number or the sale weight with a weight recorded in commodity information prepared in advance is useless.

SUMMARY OF THE INVENTION

The present disclosure has been made in view of the circumstances described above, and there are provided a commodity search device and a commodity information-processing device capable of easily specifying individual sale commodities without imposing an excessive manipulation burden on a customer.

According to one embodiment of the present invention, a commodity search device may include, but is not limited to, a storage unit, a measuring unit, a number input unit, a unit average weighing value calculator, and a first commodity search unit. The storage unit stores commodity information including a reference unit weight determined for each commodity. The measuring unit measures a total weight of commodities placed at a predetermined weighing position. The number input unit is allows inputting the number of the weighed commodities. The unit average weighing value calculator divides the total weight of the commodities weighed by the measuring unit by the number input by the number input unit to calculate a unit average weighing value per one commodity. The first commodity search unit searches for commodities falling within a weight deviation from the storage unit using the unit average weighing value.

According to one embodiment of the present invention, when specifying of commodities is performed, the total weighing value obtained by the measuring unit is divided by the input number to calculate the unit average weighing value only when an operator performs the number input, and candidates of a commodity having the unit average weighing value that is the same as or similar to the reference unit weight value stored in the storage unit are searched for by the first commodity search unit. Accordingly, it is possible to select the commodity with a smaller number of manipulations.

In some cases, the commodity search device may include, but is not limited to, the storage unit further storing optical characteristic data as the commodity information. Also, the commodity search device may include, but is not limited to, an imaging unit and a second commodity search unit. The imaging unit takes an optical image of the commodities placed at the weighing position and generates at least one of an image and color data of the commodities placed at the weighing position. The second commodity search unit searches for commodities having optical characteristic data that is the same as or similar to the optical characteristic data from only the commodities searched by the first commodity search means, using the image or the color data.

Since the commodity search based on the image data obtained by the imaging unit is performed along with the commodity search based on the reference unit weight value, it is possible to perform the commodity search with higher accuracy as compared to searching using only a weighing means or searching using only an image recognition unit. Further, in the commodity search process based on the image data, when search is performed based on all commodity data stored in the storage unit, an enormous process is necessary. Accordingly, it takes a long time to perform the commodity search process. However, in one embodiment of the present invention, the number of commodities that are targets of the search process based on the image data is limited by the weighing-based search process in advance, making it possible to perform the search process in a short time.

In some cases, the commodity search device may include, but is not limited to, a display and a selection unit. The display displays the searched commodity candidates. The selection unit selects one from among the commodity candidates displayed by the display as the commodity placed at the weighing position.

It is possible for an operator to easily select the commodity placed at the weighing position from among a few candidate commodities displayed on the display.

In some cases, the commodity search device may include, but is not limited to, the first commodity search unit performing the search from only commodities whose unit weight value has been set.

In the commodity search based on the number input and the weight, commodities for weight-based sale having nonuniform weight per commodity are excluded from search targets irrespective of whether the commodities are for number-based sale or for weight-based sale. Thus, it is possible to increase a commodity search speed.

In some cases, the commodity search device may include, but is not limited to, the storage unit further including sale unit information indicating whether associated commodities are for number-based sale or for weight-based sale, and the first commodity search unit performing the search from only commodities whose sale unit information indicates the number-based sale.

When commodities which cannot be for number-based sale and the number of which cannot be input are also for weight-based sale, the commodity search based on the number input and the weight is performed from commodities whose sale unit information in the commodity database indicates the number-based sale. Thus, it is possible to increase high commodity search speed.

In some cases, in the commodity search device, the reference unit weight value of the commodity information stored in the storage unit may be corrected and a reference unit weight value associated with the commodities of the commodity information is updated using the unit average weighing value.

Data of the unit average weighing value of the commodity calculated by the unit average weighing value calculator can be automatically rewritten as the reference unit weight data of commodity information as it is. Thus, it is possible to update the data with the latest commodity data without a data change manipulation for updating.

According to another embodiment of the present invention, a commodity information processing device may include, but is not limited to, the commodity search device, and for the respective commodities of the commodity information, the commodities sold in a weight unit have a price per weight unit and the commodities sold in a number unit have a price per quantity unit, and a weight or a quantity of the commodities weighed by the measuring unit is multiplied by the unit price to calculate a price of the commodities weighed by the measuring unit.

Whether a sale is a number-based sale or a weight-based sale, when a commodity is a commodity that can be counted, the commodity search process based on number input can correspond to both the number-based sale and the weight-based sale.

BRIEF DESCRIPTION OF THE DRAWINGS

FIG. 6 is a diagram showing an example of a structure of a commodity database 121 stored in a storage unit 120 in accordance with the first embodiment of the present invention;

DETAILED DESCRIPTION OF THE INVENTION

First Embodiment

[Configuration of Label-Issuing Device]

Figure 1:
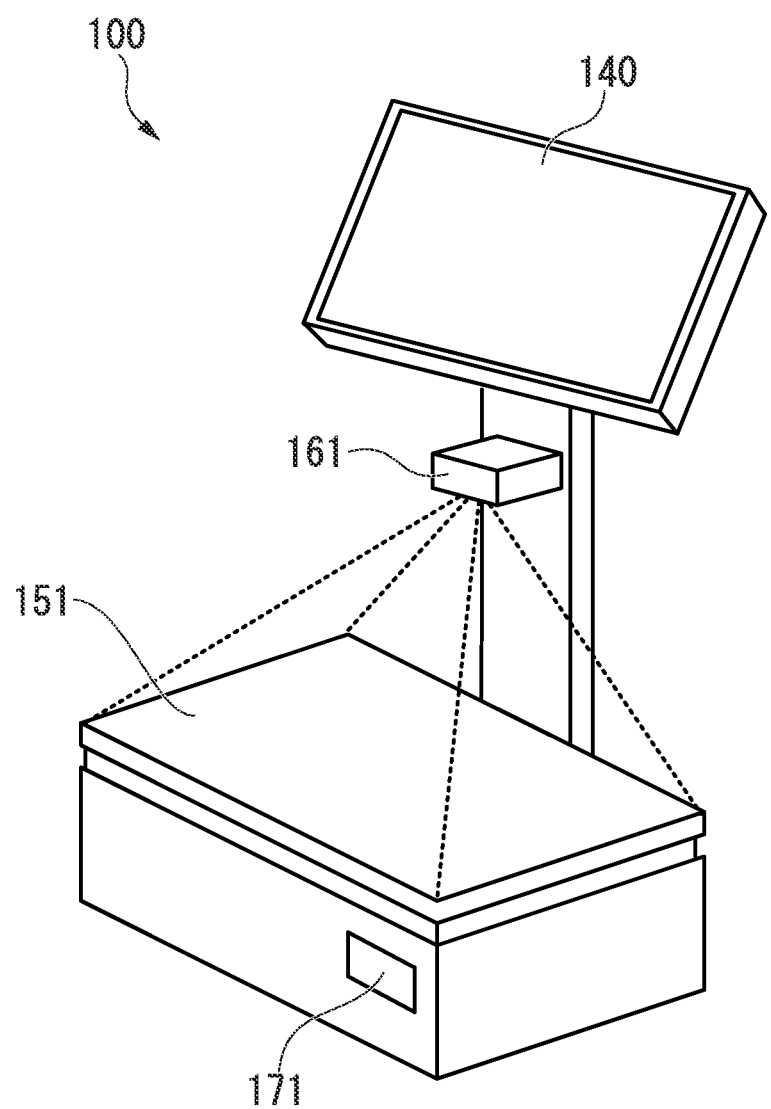
FIG. 1 is a perspective view showing an example of an appearance of a label-issuing device 100 in accordance with a first embodiment of the present invention.

FIG. 1 is a perspective view showing an example of a label-issuing device 100 in accordance with a first embodiment of the present invention. The label-issuing device 100 is an example of a commodity search device in the present embodiment.

The label-issuing device 100 is arranged, for example, at a fresh food sale place in a store such as a supermarket, and issues a label corresponding to a commodity that a customer desires to purchase according to a manipulation made by the customer. For each commodity purchased by the customer, an identification code of the commodity, a commodity name, a price (a purchase amount) calculated according to the number or the weight of the commodity, and the like are printed on the label in a barcode format. Also, the barcode may be a one-dimensional barcode or may be a two-dimensional barcode.

The label-issuing device 100 shown in FIG. 1 may include, but is not limited to, a touch panel display unit 140, a scale stand 151, a camera 161, and a label outlet 171. The touch panel display unit 140, for example, is a display which is a combination of a liquid crystal display device and a touch panel. Various manipulation images for manipulation by a customer in connection with label-issuing are displayed on the touch panel display unit 140. Further, the touch panel display unit 140 detects a manipulation made with respect to the displayed manipulation image using the touch panel.

The scale stand 151 is included in the label-issuing device 100 according to a weighing function of the label-issuing device 100, and is a part on which commodities that the customer wants to purchase are placed to be weighed. The label-issuing device 100 can obtain a weighing value of the commodity placed on the scale stand 151 by performing weighing of the commodity.

The camera 161, for example, includes an imaging element such as a CCD (Charge-Coupled Device Image Sensor) or a CMOS (Complementary Metal Oxide Semiconductor) sensor to perform imaging. The camera 161 is installed such that the scale stand 151 is included within an imaging range. That is, the camera 161 is installed so that the camera 161 can photograph the commodity placed on the scale stand 151. An image of the commodity photographed by the camera 161 is used in a commodity search process performed by the label-issuing device 100, as will be described later.

The label-issuing device 100 performs search of the commodity and calculates a price of the searched commodity (a purchase price), using information such as a weight obtained by weighing the commodity placed on the scale stand 151 and a purchase number input by the customer, as will be described later. Also, the label-issuing device 100 issues a label indicating the commodity name or the price of the commodity. The label outlet 171 is a part from which the issued label is discharged. The customer holds the label of each purchase commodity discharged from the label outlet 171 and goes to a register for settlement of accounts.

Figure 2:
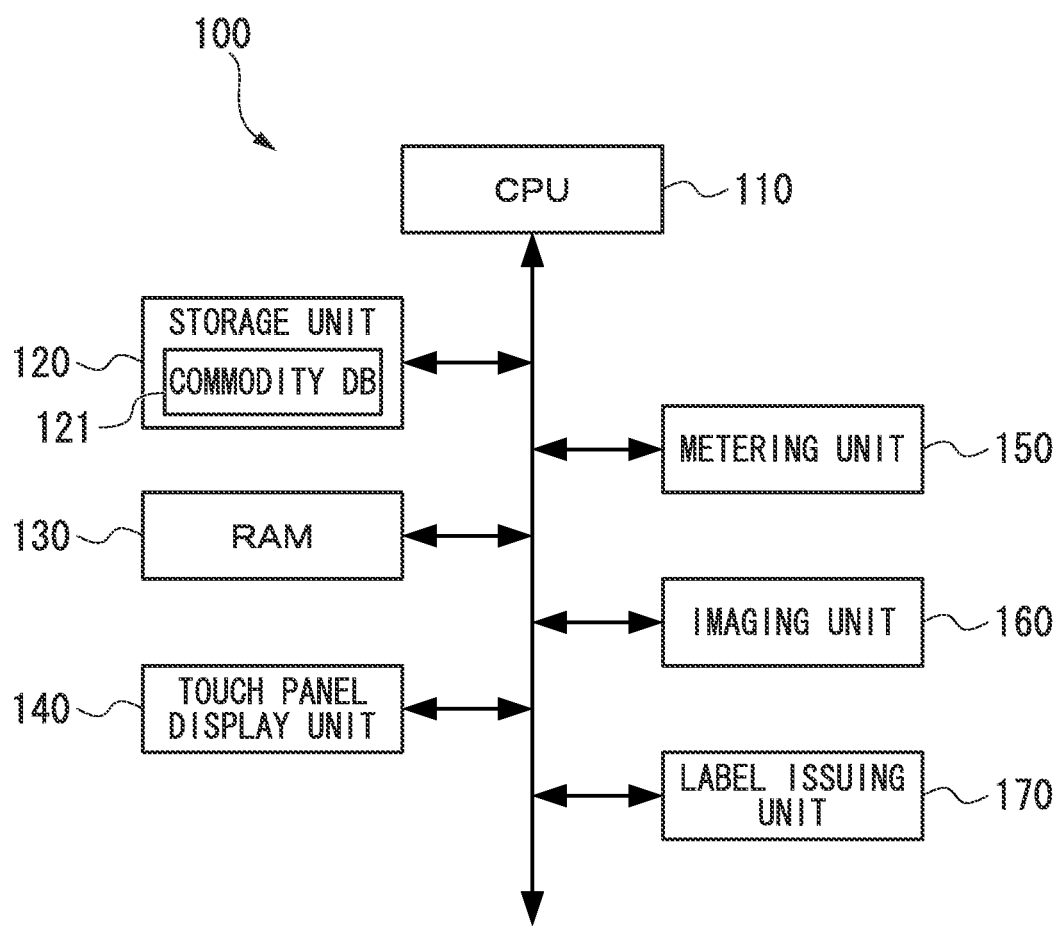
FIG. 2 is a diagram showing an example of a configuration of the label-issuing device 100 in accordance with the first embodiment of the present invention.

FIG. 2 is a diagram showing an example of a configuration of the label-issuing device 100 in accordance with the first embodiment of the present invention. The label-issuing device 100 shown in FIG. 2 may include, but is not limited to, a CPU (Central Processing Unit) 110, a storage unit 120, a RAM 130, a touch panel display unit 140, a measuring unit 150, an imaging unit 160, and a label-issuing unit 170.

The CPU 110 controls each unit shown in FIG. 2 by executing a program stored in the storage unit 120. The storage unit 120 functions as a subsidiary storage device and stores programs executed by the CPU 110 and various necessary data. As shown in FIG. 2, a commodity database 121 is shown as one of the data stored in the storage unit 120. The CPU 110 uses the commodity database 121 to execute the commodity search process, as will be described later. An example of a structure of the commodity database 121 will be described later.

The RAM 130 is a memory in which programs read and executed from the storage unit 120 by the CPU 110 or work areas are developed. Also, in the RAM 130, data of a commodity file stored in the storage unit 120 is read and developed by execution of the program.

The measuring unit 150 includes the scale stand 151 previously shown in FIG. 1 and weighs the commodity placed on the scale stand 151 to output a weighing value. The output weighing value is used by the CPU 110 in the commodity search process, as will be described later.

The touch panel display unit 140 displays a manipulation screen to be manipulated by the customer under control of the CPU 110, as previously described with reference to FIG. 1. Also, the touch panel display unit 140 detects a manipulation with respect to the displayed manipulation screen using the touch panel and outputs a manipulation signal. The CPU 110 executes a predetermined process according to the input manipulation signal.

The label-issuing unit 170 includes the label outlet 171 shown in FIG. 1. The label-issuing unit 170 prints predetermined items such as the commodity name and the price on a predetermined paper as the label, for example, in a barcode format, and issues the printed label by discharging the label from the label outlet 171.

[Use of Label-Issuing Device in Store]

Figure 3:
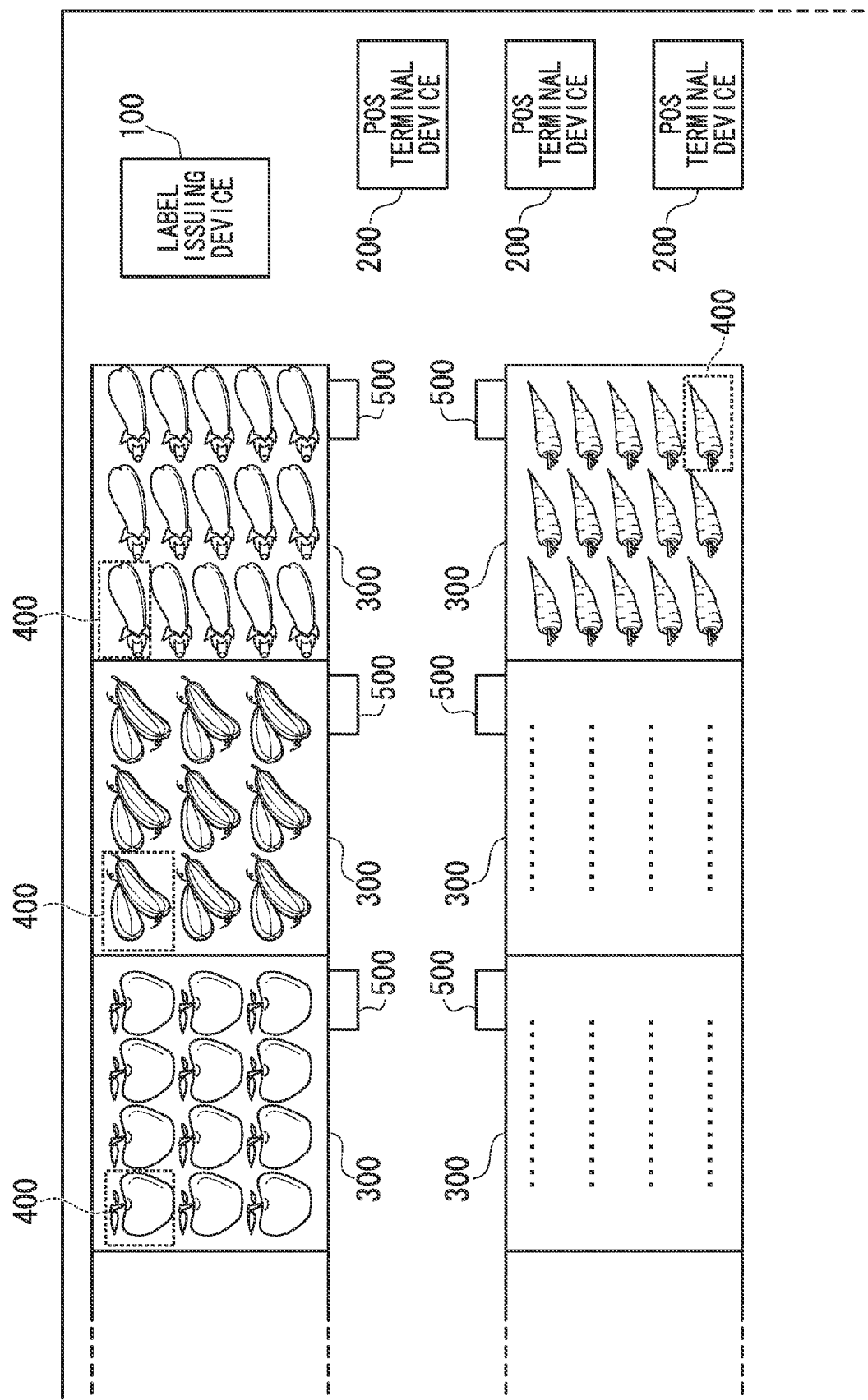
FIG. 3 is a diagram showing an example of facility arrangement in a store in which the label-issuing device 100 in accordance with the first embodiment of the present invention is installed.

A use example of the label-issuing device 100 in a store will be described with reference to FIG. 3. FIG. 3 schematically shows, in a plan view, an example of facility arrangement in a store in which the label-issuing device 100 in accordance with the first embodiment of the present invention is installed. In FIG. 3, a fresh food sale place in, for example, a supermarket, is assumed. In the sale place, commodity display stands 300, 300 . . . are arranged, and commodities 400, 400 . . . such as vegetables or fruits are divided and displayed on the commodity display stands 300, 300 . . . according to types of the commodities. The commodities 400, 400 . . . are for, for example, individual sale from one commodity. Further, a plastic bag receptacle 500 is arranged in the vicinity of the commodity display stands 300, 300 . . . . The customer takes a plastic bag from the plastic bag receptacle 500, and puts a necessary number of commodities in the plastic bag for types of the commodities 400.

The commodities 400 are for individual sale, as described above, and displayed on the commodity display stand 300 without labels with a price, a barcode or the like printed thereon. In order to purchase commodities put in the bag as described above, the customer goes to a place at which the label-issuing device 100 has been installed, and causes the label-issuing device 100 to weigh each commodity in the bag, search for each commodity, calculate a price according to the number or the weight of the searched commodities (pricing), and issue the label. Also, the customer attaches the label issued for each commodity to the bag of the commodities and goes to the POS terminal device 200. Also, the customer causes the POS terminal device 200 to read the labels and, for example, calculate a total purchase amount, and performs settlement of accounts. A manipulation of the POS terminal device 200 for the settlement of accounts is performed, for example, by a clerk. Alternatively, when the POS terminal device 200 is a self accounting system, the customer manipulates the POS terminal device 200 to perform the settlement of accounts.

Further, the camera 161 shown in FIG. 1 and the imaging unit 160 of FIG. 2 are used in a second embodiment, which will be described later. Accordingly, in the first embodiment, the camera 161 and the imaging unit 160 may be omitted.

[Operation of Label-issuing Device]

Figure 4:
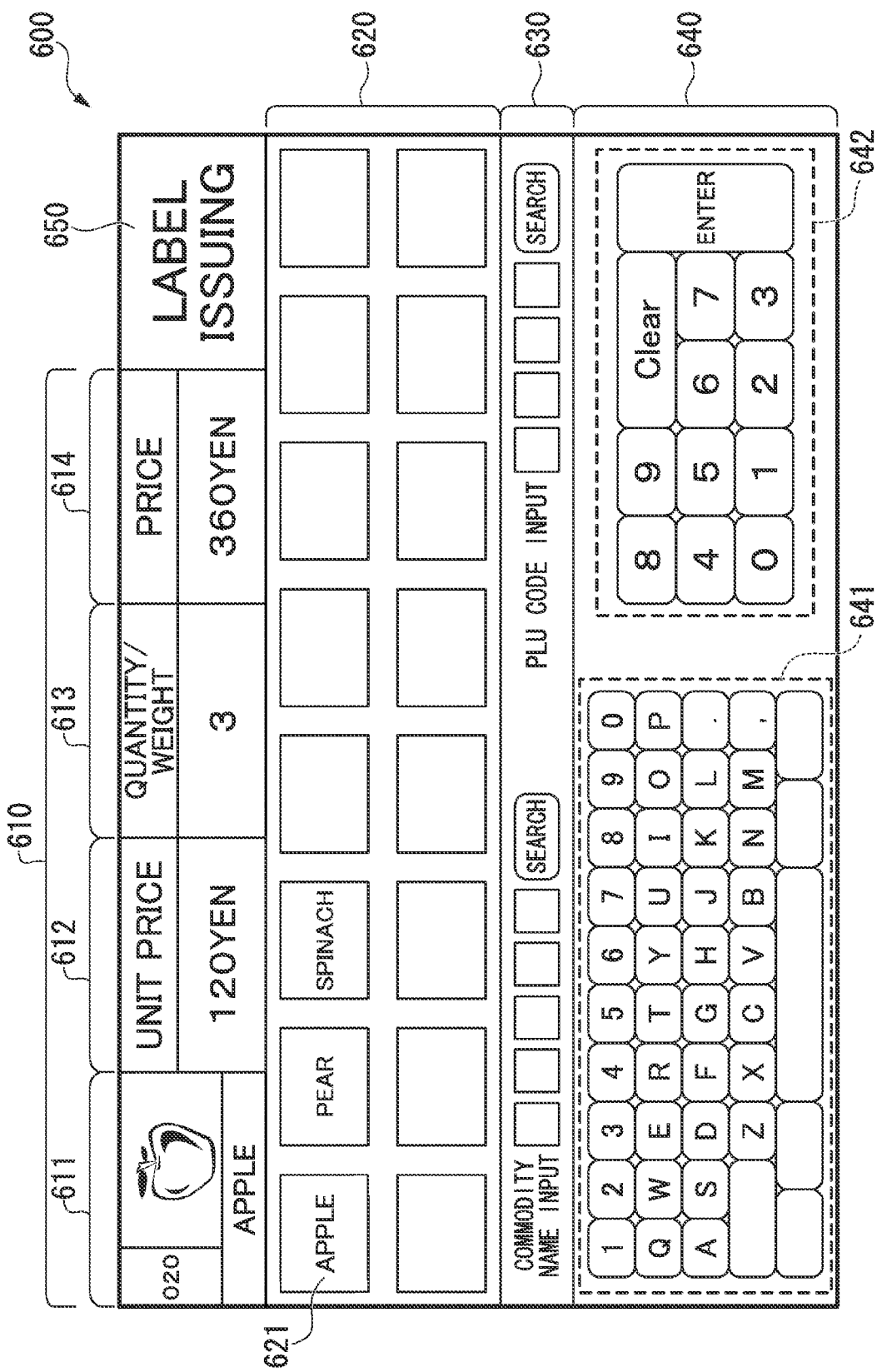
FIG. 4 is a diagram showing an example of a manipulation screen 600 (after commodity search) displayed on a touch panel display unit 140 of the label-issuing device 100 in accordance with the first embodiment of the present invention.

An example in which the customer uses the label-issuing device 100 and an example in which the label-issuing device 100 correspondingly operates will be described. FIG. 4 is a diagram showing an example of a manipulation screen 600 (after commodity search) displayed on a touch panel display unit 140 of the label-issuing device 100 in accordance with the first embodiment of the present invention. The manipulation screen shown in FIG. 4 includes a selected commodity information area 610, a commodity selection area 620, a search area 630, a soft key area 640, and a label-issuing button 650.

The label-issuing device 100 searches for one or more candidates estimated as the commodity placed on the scale stand 151 by the customer and presents the commodity candidates, as will be described later. The customer performs a manipulation to select the commodity actually placed by the customer from among the presented commodity candidates. Information on the selected commodity is displayed in the selected commodity information area 610 as follows. The selected commodity information area 610 may include, but is not limited to, a commodity presentation area 611, a unit price area 612, a quantity/weight area 613 and a price area 614, as shown in FIG. 4.

The commodity presentation area 611 is an area for presenting the selected commodity so that the customer can visually recognize the commodity. For example, a thumbnail image representing a pattern of the commodity and letters indicating a commodity name, such as "apple," are shown, as shown in FIG. 4. Further, a number "020" shown in the commodity presentation area 611 is a PLU (Price Look Up) code and is an identifier of the commodity.

A unit price per one commodity is shown in the unit price area 612 when the corresponding commodity presented in the commodity presentation area 611 is for number-based sale. Also, a price per predetermined unit weight (e.g., 100 g) is shown when the commodity is for weight-based sale. The number (in the case of the number-based sale) or the weight (in the case of the weight-based sale) of the corresponding commodity is shown in the quantity/weight area 613. A price of the corresponding commodity (represented as (price×quantity) or (price×weight)) based on the unit price shown in the unit price area 612 and the number or the weight shown in the quantity/weight area 613 is shown in the price area 614.

A predetermined plurality of commodity buttons 621 having different commodity names displayed thereon are displayed in the commodity selection area 620. The customer performs a touch manipulation to select one from among the plurality of commodity buttons 621 displayed in the commodity selection area 620. Through this manipulation, the commodity that is a purchase target of the customer is selected and determined. Also, an example of a display transition in the commodity selection area 620 according to the customer manipulation will be described later.

An image for a manipulation to directly search for the commodity displayed in the selected commodity information area 610 using a commodity name or a PLU code is displayed in the search area 630. Accordingly, a part of the area that enables the customer to input the commodity name for search, and a part of the area that enables the customer to input the PLU code for search are displayed in the search area 630. This search area 630 enables the customer to select a commodity whose label is desired to be issued and to cause the label to be issued, for example, even when the customer does not use the commodity search function of the label-issuing device 100 for whatever reason.

The soft key area 640 is a part in which software keys are displayed. For example, an alphabet key part 641 and a numeric key part (number input unit) 642 are displayed as shown in FIG. 4. The customer may perform a manipulation with respect to the alphabet key part 641 or the numeric key part 642 to input a word or a number, if necessary. For example, the number of commodities in commodity search, which will be described later, is input by a manipulation with respect to the numeric key part 642. Also, input of the commodity name or the PLU code in the search area 630 may be performed by a manipulation with respect to the alphabet key part 641 or the numeric key part 642.

The label-issuing button 650 is a button displayed for a label-issuing manipulation. As a touch manipulation with respect to the label-issuing button 650 is performed, the label-issuing device 100 issues a label on which the commodity name, the price and the like of the commodity displayed in the selected commodity information area 610 are printed in a bar code format, and causes the label to be discharged from the label outlet 171.

The manipulation screen 600 shown in FIG. 4 corresponds to a state in which a result of selecting a commodity to be displayed in the selected commodity information area 610 is displayed. On the other hand, FIG. 5 shows a manipulation screen 600 displayed, for example, in a standby state until a customer places a commodity on the scale stand 151 after a last label is issued.

Figure 5:
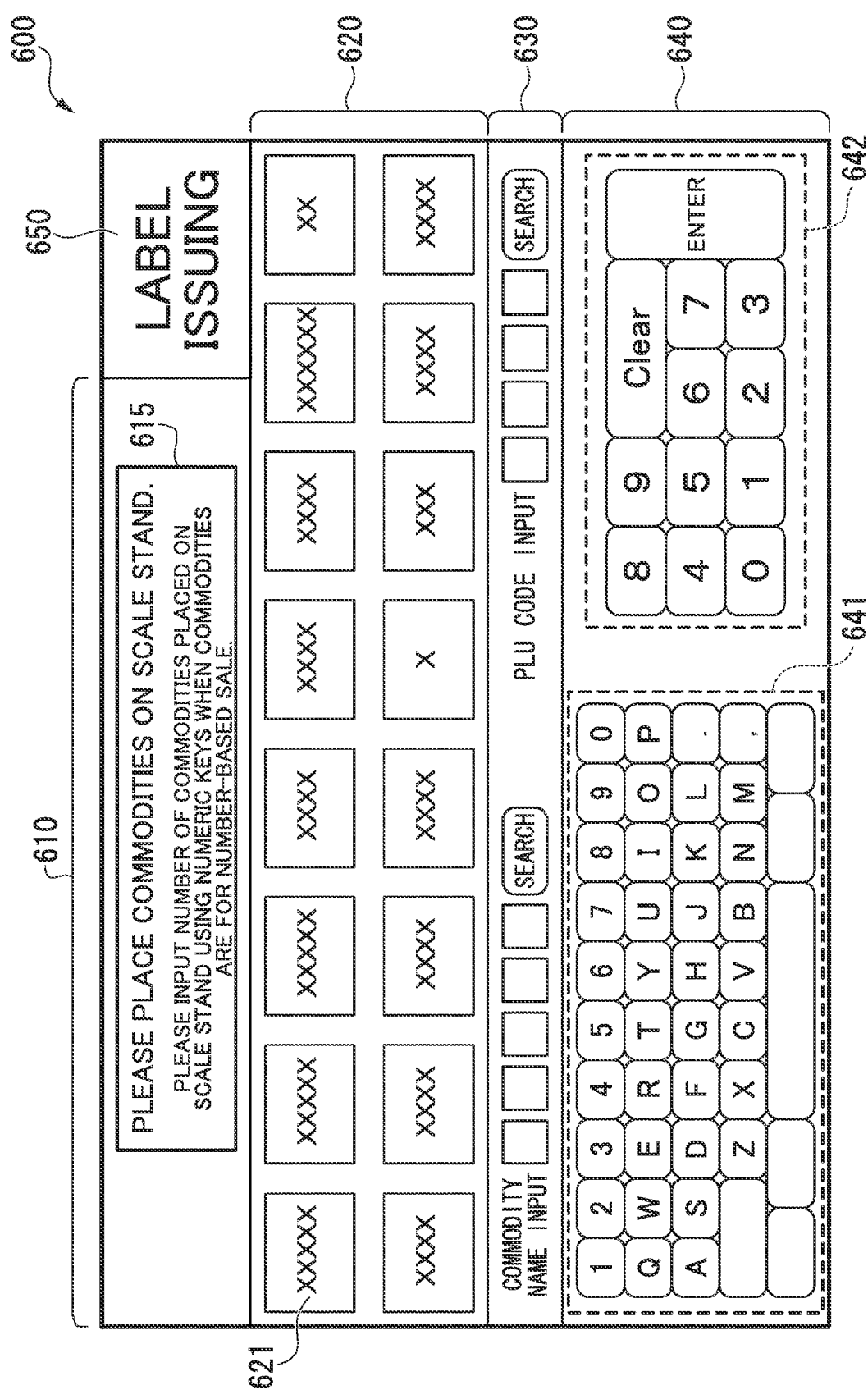
FIG. 5 is a diagram showing an example of the manipulation screen 600 (before commodity search) displayed on the touch panel display unit 140 of the label-issuing device 100 in accordance with the first embodiment of the present invention.

The selected commodity information area 610 of FIG. 5 shows display content corresponding to a state of waiting for a commodity selection manipulation to be performed. That is, it shows a display to prompt the customer to place commodities on the scale stand 151 and to input the number of the commodities placed on the scale stand 151 through a manipulation with respect to the numeric key part 642 when the commodities placed on the scale stand 151 are for number-based sale.

In this case, the commodity selection area 620, for example, is in a state in which all the commodity buttons 621 corresponding to all the commodities dealt at the fresh food sale place shown in FIG. 3 and assigned predetermined commodity names are displayed.

In the above state, the customer places three apples put in a plastic bag on the scale stand 151. Also, the customer performs a manipulation with respect to the numeric key part 642 to input "3," which is the number of the apples placed on the scale stand 151 at this time. In response thereto, the label-issuing device 100 weighs the three apples placed on the scale stand 151. Also, the label-issuing device 100 divides the weight by "3," which is the input number of the apples, to calculate a weight per one apple (a unit average weighing value).

The weight per one commodity (a reference unit weight) is stored for each commodity in the commodity database 121 stored in the storage unit 120. The label-issuing device 100 selects a predetermined number of commodities in order of commodities having unit average weighing values closer to the reference unit weight from the commodity database 121. Also, the selected commodities are displayed in the commodity selection area 620. The reference unit weight of the selected commodities may be considered to be the same as the calculated unit average weighing value. Also, as a concrete example, here, apple, pear, and spinach are assumed to be selected in order of commodities having the reference unit weight closer to the unit average weighing value. Accordingly, the commodity selection area 620 transitions from the display of FIG. 5 to the display of FIG. 4. That is, a state transition from a state in which names of all the commodities dealt at the fresh food sale place are displayed on the respective commodity buttons 621, for example, to a state in which only the apple, the pear, and the spinach are displayed on the three commodity buttons 621 at an upper left side.

The customer performs a touch manipulation with respect to the commodity button 621 corresponding to the commodities placed on the scale stand 151 from among the three commodity buttons 621. Specifically, since the customer places the apples on the scale stand 151, the customer performs the touch manipulation with respect to the commodity button 621 on which the apple is displayed.

According to the touch manipulation, content shown in FIG. 4 is displayed in the selected commodity information area 610. That is, the image, the name, and the PLU code that indicate the apple are displayed in the commodity presentation area 611, and the unit price of the apple is displayed in the unit price area 612. Also, the number input by the customer is displayed in the quantity/weight area 613. The price obtained by "price×number" is displayed in the price area.

The customer confirms the content displayed in the selected commodity information area 610. Also, when there is an error in the display content due to a manipulation mistake, the selection of the commodity may be performed again by a predetermined manipulation with respect to the manipulation screen 600. Also, when there is no error in the content displayed in the selected commodity information area 610, the customer performs a touch manipulation with respect to the label-issuing button 650. Accordingly, a label corresponding to the three apples is issued. Since the issued label is discharged from the label outlet 171, the customer takes the label out.

For example, when the commodity search process is not performed by the label-issuing device 100 as described above, the customer must look for the commodity button 621 corresponding to a desired commodity from the commodity selection area 620 in which commodity names are displayed on all the commodity buttons 621, as shown in FIG. 4. That is, the customer is forced to perform a very troublesome task.

On the other hand, in the present embodiment, when the customer places commodities on the scale stand 151 and performs the manipulation to input the number of the placed commodities, a search process for the commodities is performed by the label-issuing device 100 and candidates of only a few types of commodities are presented as candidates of the commodities. That is, the customer can select a desired commodity from among the candidates of a few commodities, and accordingly, the customer can immediately look for a desired commodity and perform the manipulation to select the commodity. Further, in the present embodiment, the commodities for number-based sale are weighed, the weight is divided by the number of the commodities to obtain a unit average weighing value per commodity, and this unit average weighing value is compared with the reference unit weight in the commodity database 121. Thus, it is possible to appropriately cope with various commodities having different weights per one commodity and perform the commodity search.

[Structure of Commodity Database]

An example of a configuration of technology for realizing operation of the label-issuing device 100 described with reference to FIGS. 4 and 5 will be described. First, an example of a structure of the commodity database 121 stored in the storage unit 120 will be described with reference to FIG. 6.

The commodity database 121 shown in FIG. 6 is formed with a PLU code, a commodity name, a unit price, a sale unit, a reference unit weight, icon display data, and captured image comparison data associated with one another for each commodity.

The PLU code indicates a PLU code given to a corresponding commodity. The commodity name indicates a commodity name of the corresponding commodity. The unit price indicates a unit price of the corresponding commodity, and when the corresponding commodity is a number-based sale commodity, a unit price per one commodity is shown and when the corresponding commodity is a weight-based sale commodity, a unit price per predetermined unit weight (e.g., 100 g) is shown. The sale unit indicates whether a unit corresponding to the unit price is "number" or "weight," and when the corresponding commodity is a number-based sale commodity, the sale unit is shown as "number," and when the corresponding commodity is the weight-based sale commodity, the sale unit is shown as "weight." Further, for classification of the "number" and the "weight," for example, the "number" and the "weight" may be defined as values "0" and "1."

The reference unit weight is an attribute significantly set only for a commodity whose sale unit is "number," and indicates a reference weight per one corresponding commodity. In the case of fresh food such as vegetables, since there is a difference in individual weight, it is necessary to specify one value of the reference unit weight according to a rule. A scheme for this is not particularly limited, but for example, specifying the reference unit weight based on a value obtained from an average value or normal distribution of a predetermined sample number of commodity weights may be considered. The icon display data is data used to display, for example, a commodity name displayed on the commodity button 621 or a thumbnail image in the commodity presentation area 611.

Further, since the captured image comparison data is data used in the second embodiment, which will be described later, a description thereof will be omitted herein. In the first embodiment, the attribute of the captured image comparison data may be omitted from a record in the commodity database 121.

[Operations]

An example of the operations of the label-issuing device 100 in the first embodiment will be described with reference to a flowchart of FIG. 7. Further, the process shown in FIG. 7 may be regarded as being realized by the CPU 110 shown in FIG. 2 executing the program stored in the storage unit 120.

First, in step S101, the CPU 110 causes the manipulation screen 600 (FIG. 5) in a standby state to be displayed on the touch panel display unit 140. In this state, the CPU 110 waits for a commodity search manipulation using the search area 630 to be performed in step S102. In other cases, the CPU 110 waits for a touch manipulation (commodity selection manipulation) to select any of commodity buttons 621 in the commodity selection area 620 to be performed. The commodity buttons 621 corresponding to all commodities dealt at the sale place are displayed in the commodity selection area 620 of the manipulation screen 600, which is in the standby state, as described above.

If it is determined in step S102 that either the search manipulation or the touch manipulation with respect to the commodity button 621 is performed, the CPU 110 proceeds to step S109, which will be described later. If the search manipulation or the touch manipulation with respect to the commodity button 621 is not performed, the CPU 110 waits for a manipulation to input the number of the commodities placed on the scale stand 151 (a number input manipulation) to be performed in step S 103. If the commodities placed on the scale stand 151 are for number-based sale, the customer performs a number input manipulation. In the case of the weight-based sale commodity, the customer need not perform the number input manipulation and accordingly searches for and designates the commodity, for example, through the search manipulation. Alternatively, the customer designates the commodity through a manipulation to select the desired commodity button 621 from among the commodity buttons 621 corresponding to the dealt commodities displayed in the commodity selection area 620 in the standby state.

If the CPU 110 determines in step S103 that the number input manipulation has been performed, the CPU 110 executes a process in steps S104 and S105. In step S104, the CPU 110 weighs the commodities placed on the scale stand 151 at that time and acquires a weight value. In step S105, a unit average weighing value calculator in the CPU 110 divides the acquired weight value by a value of the commodity number input in step S103 to calculate a unit average weighing value of the commodity.

In step S106, a first commodity search unit in the CPU 110 performs a process of searching for the commodities placed on the scale stand 151. For this, the first commodity search unit in the CPU 110 selects, from the commodity database 121, a predetermined number of commodities in order from the commodity having a reference unit weight closest to the value of the unit average weighing value calculated in step S105. Specifically, an example in which three commodities of an apple, a pear, and spinach are selected in order from the commodity having the unit average weighing value closer to the reference unit weight is shown in FIG. 4.

In the first embodiment, one or more selected commodities are candidates of the commodities placed on the scale stand 151, which corresponds to the result of the commodity search process in the first embodiment.

After the commodity search process is executed as described above, the CPU 110 executes display control for the selected commodity information area 610 to switch to a display in which the commodity buttons 621 indicating the searched commodities are arranged, in step S107. That is, the CPU 110 switches from the display of the selected commodity information area 610 shown in FIG. 5 to the display of the selected commodity information area 610 shown in FIG. 4. The customer selects the commodity button 621 corresponding to the commodities actually placed on the scale stand 151 from among the displayed commodity buttons 621 and performs a touch manipulation. That is, the customer performs a commodity selection by selecting the commodity button 621 (a selection unit) and designation manipulation. The CPU 110 waits for the selection and designation manipulation for the commodity button 621 to be performed in step S108, and proceeds to step S109 when the manipulation is performed.

The CPU 110 reads data of respective attributes of the PLU code, the commodity name, and the icon display data associated with the commodity, which has been selected and designated in step S108, from the commodity database 121 in step S109.

Also, the CPU 110 causes information on the commodity selected and designated in step S108 to be displayed as shown in the selected commodity information area 610 of FIG. 4 in step S110. That is, the CPU 110 causes the commodity presentation area 611, the unit price area 612, the quantity/weight area 613 and the price area 614 to be displayed. The commodity presentation area 611 is displayed based on the PLU code, the commodity name and the icon display data read from the commodity database 121. The unit price area 612 is displayed based on the unit price data read from the commodity database 121. In the quantity/weight area 613, the value of the commodity number input in step S103 is displayed. For the price area 614, the CPU 110 multiplies the unit price read from the commodity database 121 by the commodity number input in step S102. Also, a value of the multiplication result is displayed in the price area 614.

If the information of the selected commodity is displayed in the selected commodity information area 610 as described above, the customer manipulates the label-issuing button 650 to cause the label to be issued when there is no error in the display content. The CPU 110 waits for the manipulation with respect to the label-issuing button 650 to be performed in step S111. If the CPU 110 determines that the manipulation with respect to the label-issuing button 650 has been performed, the CPU 110 executes a label-issuing process in step S112. That is, the CPU 110 controls the label-issuing unit 170 to print predetermined information beginning with the commodity name, the price and the like for the selected commodity on the label paper in a barcode format. Also, the CPU 110 causes the printed label to be discharged from the label outlet 171.

Through the procedure of the process as described above, in response to a manipulation for the customer to input the number of the purchase target commodities for the number-based sale placed on the scale stand 151, the label-issuing device 100 of the first embodiment can automatically search for and present candidates of the commodities. Then, in response to a manipulation to select and designate the purchase target commodity from among the presented commodities, the label-issuing device 100 can issue the label of the purchase target commodity.

Second Embodiment

[Operations]

A second embodiment will be described. In the second embodiment, a configuration of the label-issuing device 100 is the same as those in FIGS. 1 and 2. In the second embodiment, image data obtained by imaging in the imaging unit 160 (including the camera 161 of FIG. 1) shown in FIG. 2 and the captured image comparison data stored in the commodity database 121 are used in the commodity search process. The captured image comparison data is, for example, data having image content of a corresponding commodity, and is an image compared with a captured commodity image obtained by imaging the commodity placed on the scale stand 151 using the imaging unit 160 for commodity search, as will be described later. Further, the captured image comparison data, for example, may be two-dimensional data obtained by analyzing image data, such as a shape or a frequency characteristic (spectrum) of an image, through association with a comparison processing scheme or method.

Figure 7:
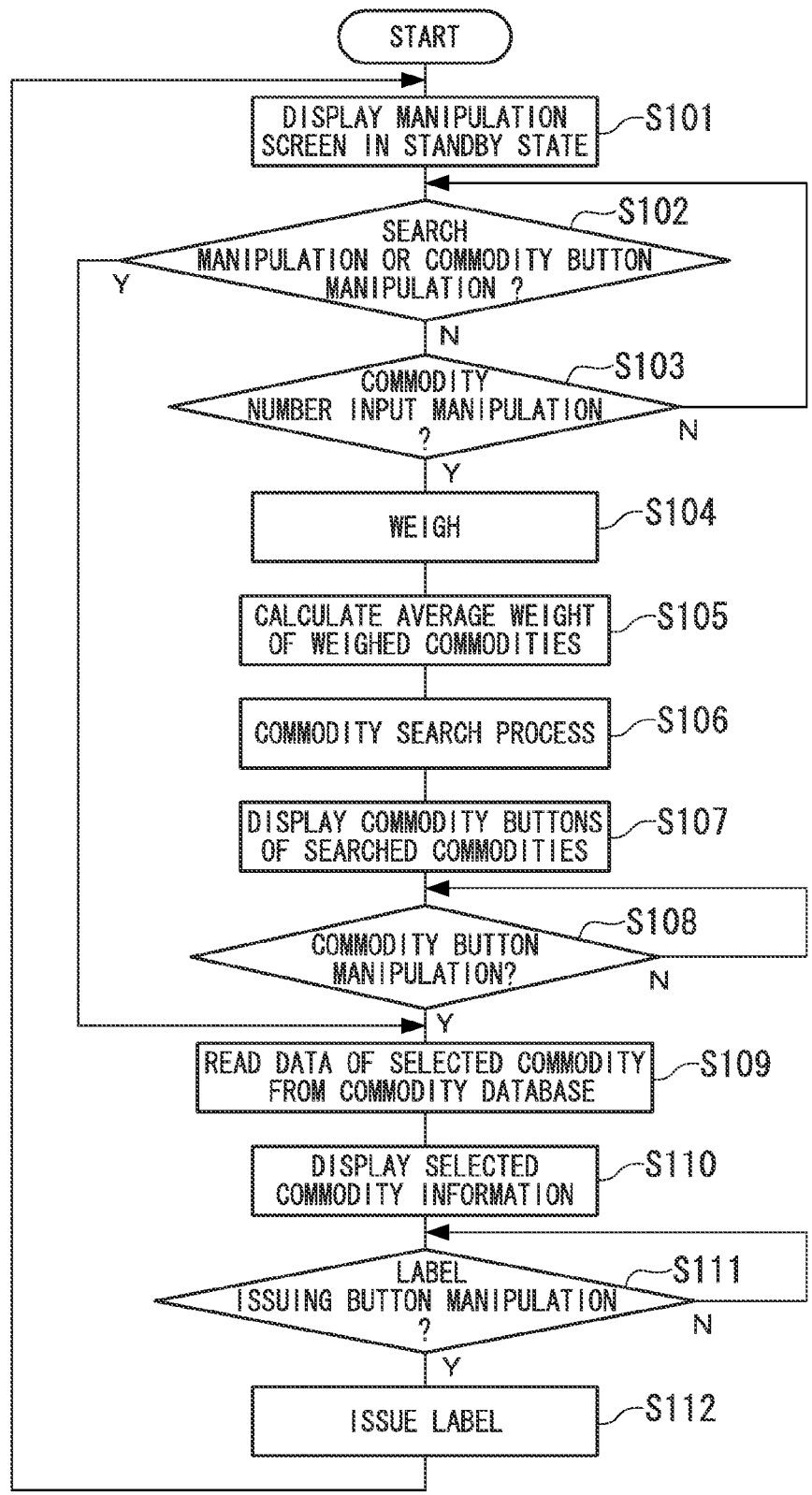
FIG. 7 is a diagram showing an example of a procedure of a process executed by a label-issuing device 100 in accordance with the first embodiment of the present invention.
Figure 8:
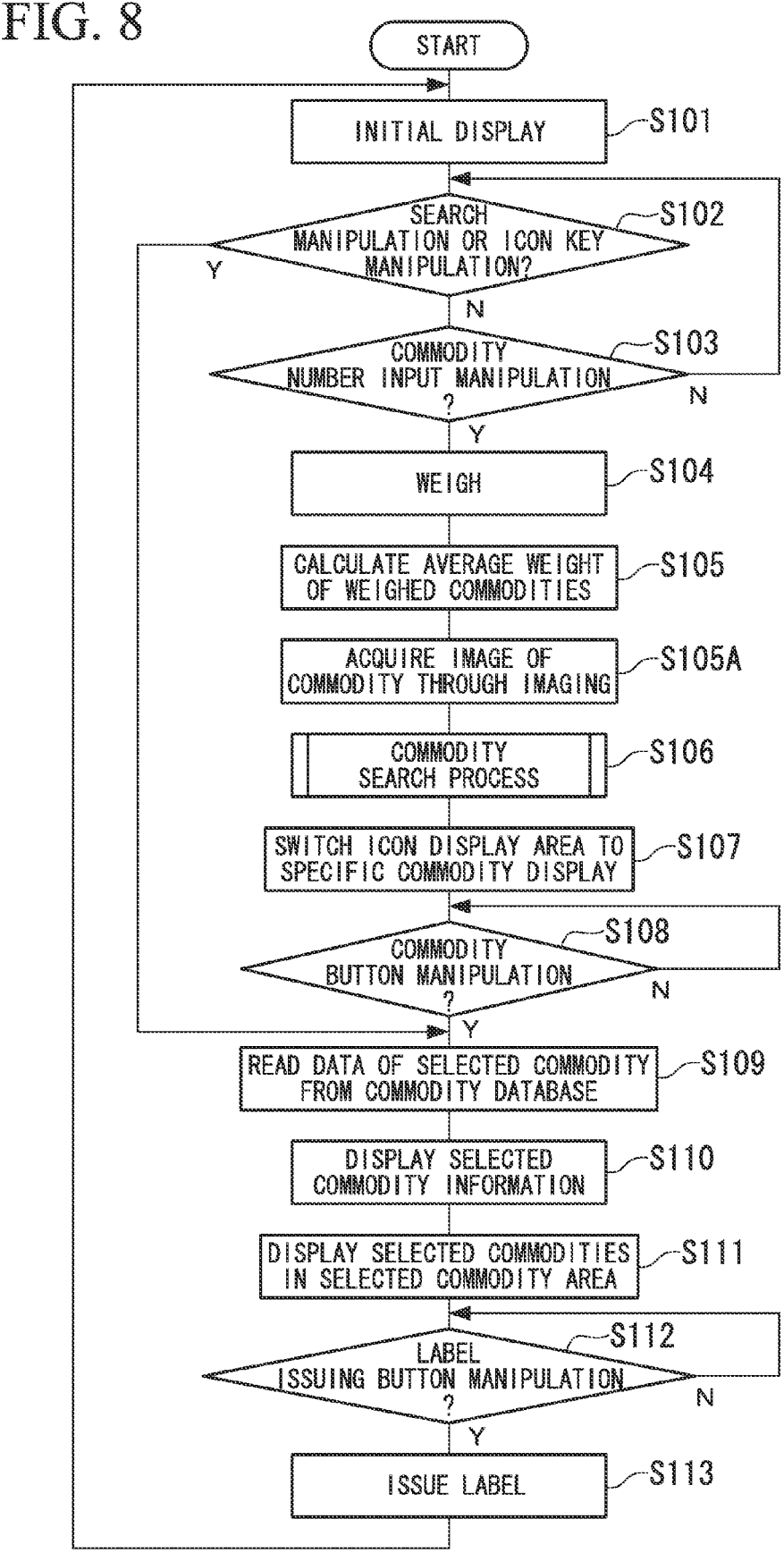
FIG. 8 is a diagram showing an example of a procedure of a process executed by a label-issuing device 100 in accordance with a second embodiment of the present invention.

A flowchart of FIG. 8 shows an example of the procedure of the process in the label-issuing device 100 in the second embodiment. In FIG. 8, the same reference numerals are given to the same processes as those of FIG. 7.

In FIG. 8, a process in steps S101 to S105 is the same as that in FIG. 7. Also, the CPU 110 executes a process in step S105A together with the weighing of the commodity and the calculation of the unit average weighing value in steps S104 and S105. In step S105A, the CPU 110 causes imaging to be executed in the imaging unit 160 to acquire an image of the commodity. For this, the CPU 110 controls the imaging unit 160 to cause the imaging to be executed. As described above, the camera 161 in the imaging unit 160, for example, is provided to photograph the scale stand 151 from above. Accordingly, an image of the commodity placed on the scale stand 151 is contained in the captured image data obtained by imaging in the camera 161. The CPU 110 extracts an image part of the commodity placed on the scale stand 151 (the captured commodity image) from the captured image obtained as described above and performs search.

In the second embodiment, a commodity search process of step S106 uses the unit average weighing value calculated in step S105 and the captured commodity image data acquired in step S105A. An example of a procedure of the process of step S106 in the second embodiment will be described later.

After the commodity search ends in step S106, the CPU 110 executes the process in steps S107 to S112. The process in steps S107 to S112 is the same as that in the first embodiment.

Figure 9:
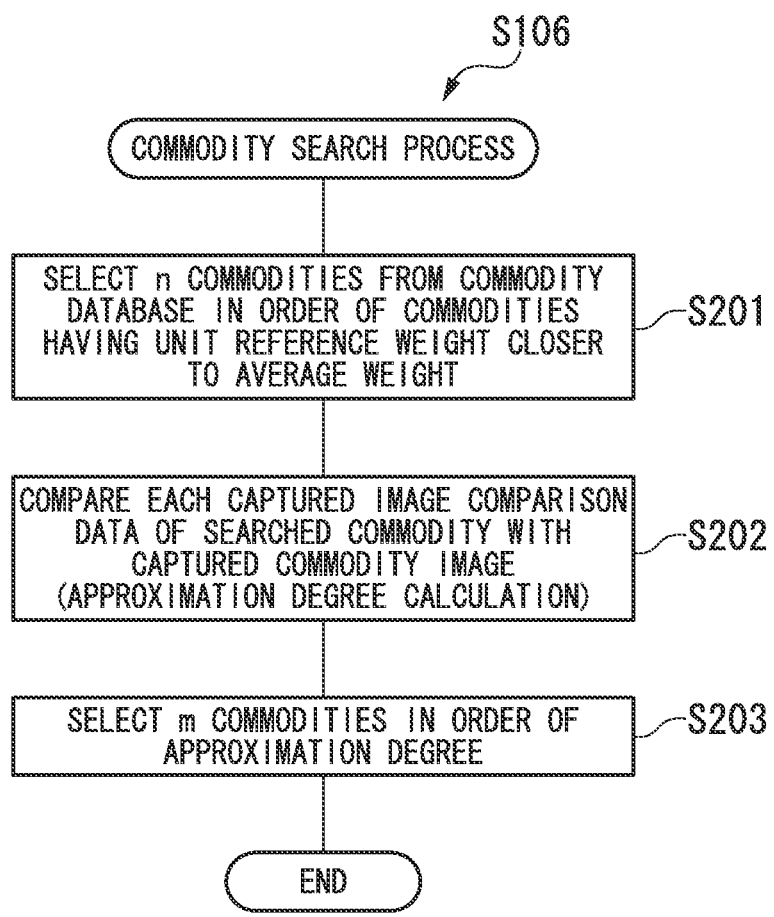
FIG. 9 is a diagram showing an example of a process procedure of a commodity search process (step S106) in FIG. 8.

A flowchart of FIG. 9 shows an example of a procedure of the commodity search process in step S106 of FIG. 8. First, in step S201, the CPU 110 selects n commodities in order of commodities having the reference unit weight stored in the commodity database 121 closer to the unit average weighing value calculated in step S105. In the first embodiment, the n commodities selected through the process in step S201 were output as the search result in step S106.

In step S202, a second commodity search unit in the CPU 110 reads the captured image comparison data associated with the n commodities selected in step S201 from the commodity database 121. Also, the second commodity search unit in the CPU 110 compares the read captured image comparison data (n data) with the captured commodity image acquired in step S105A of FIG. 8, for example, to obtain an approximation degree between the captured image comparison data and the captured commodity image. For a scheme of obtaining the approximation degree of the image any scheme may be considered, and is not particularly limited. As the scheme of obtaining the approximation degree, for example, a scheme of obtaining the approximation degree based on information of a shape may be used or a scheme of obtaining the approximation degree based on color information such as a spectral characteristic may be used. Alternatively, the schemes may be combined.

In step S203, the second commodity search unit in the CPU 110 selects m (n≥m) commodities in descending order of the approximation degrees calculated in step S202 from among the n commodities searched in step S201. That is, the commodity specifying process in the second embodiment is to specify the m commodities (a second search step) from the n commodities searched from the commodity database 121 in step S201 (a first search step), based on a result of comparing the captured commodity image with the captured image comparison data. Also, the specified m commodities are output as the search result.

In the second embodiment, the commodities are specified based on the captured image as described above, thereby further reducing the number of commodity buttons 621 displayed in the commodity selection area 620. Further, even though the number of the displayed commodity buttons 621 is reduced, accuracy of the search result is very high and reliability is high since the commodities are specified based on the captured image.

Modified Example

A modified example of the present embodiment will be described with reference to FIGS. 10 and 11. The modified example relates to an example of a display aspect of a commodity selection area 620 in a manipulation screen 600. In the commodity selection area 620 of this modified example, commodities are displayed in a list format in place of the commodity buttons 621. In this case, a PLU code, a commodity name, and a reference unit weight corresponding to each commodity are shown. A weighing value obtained by weighing the commodity placed on the scale stand 151 using the measuring unit 150 is also shown to the right of the list. Further, the display items of each commodity in the list shown in FIG. 10 are an example and a combination of other display items may be displayed.

Thus, the commodities in the commodity selection area 620 are displayed in the list format, for example, such that the customer can obtain more detailed information than commodities simply presented as selection candidates.

Figure 10:
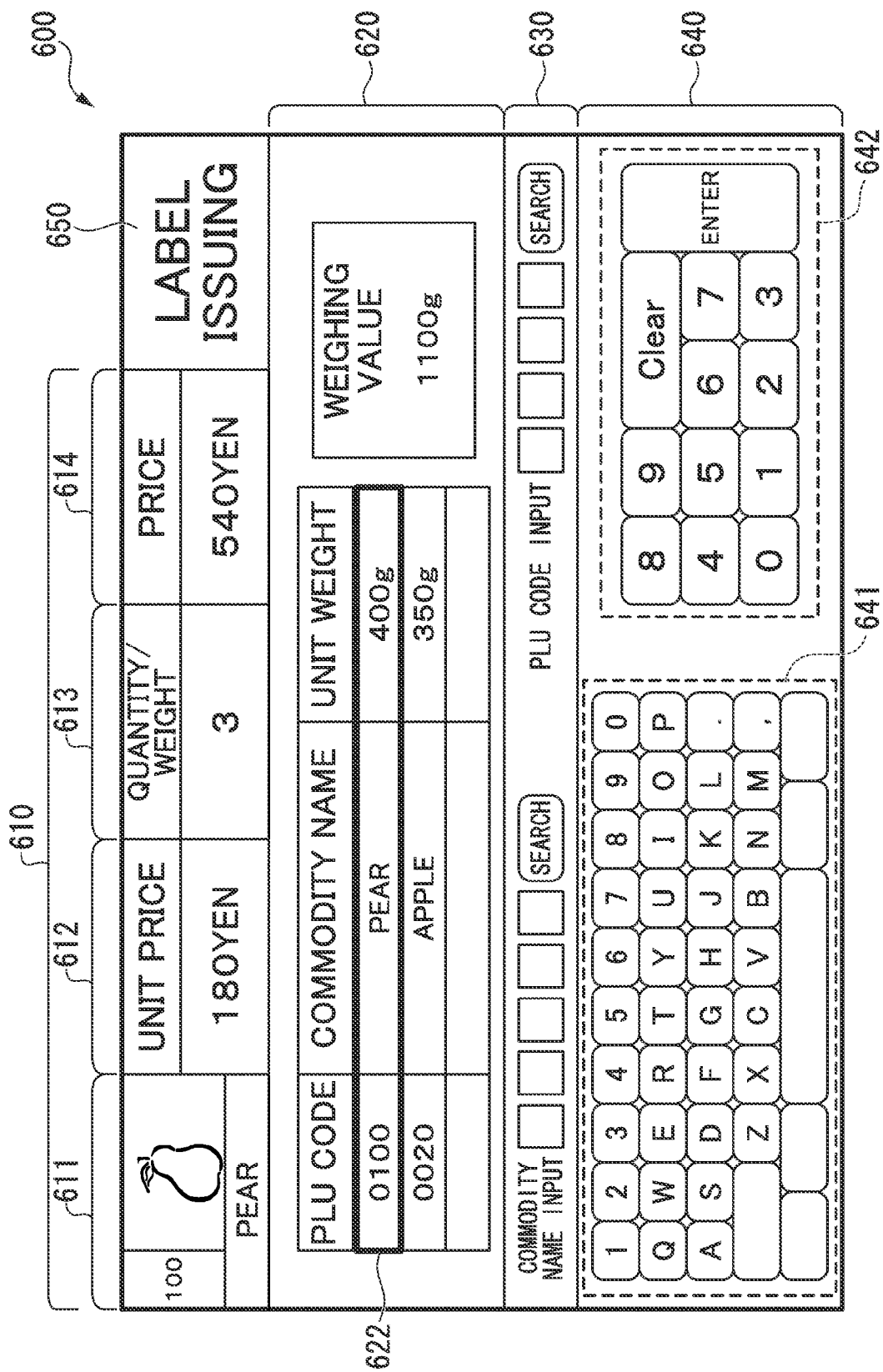
FIG. 10 is a diagram showing an example of a manipulation screen 600 in accordance with a modified example of the second embodiment of the present invention.
Figure 11:
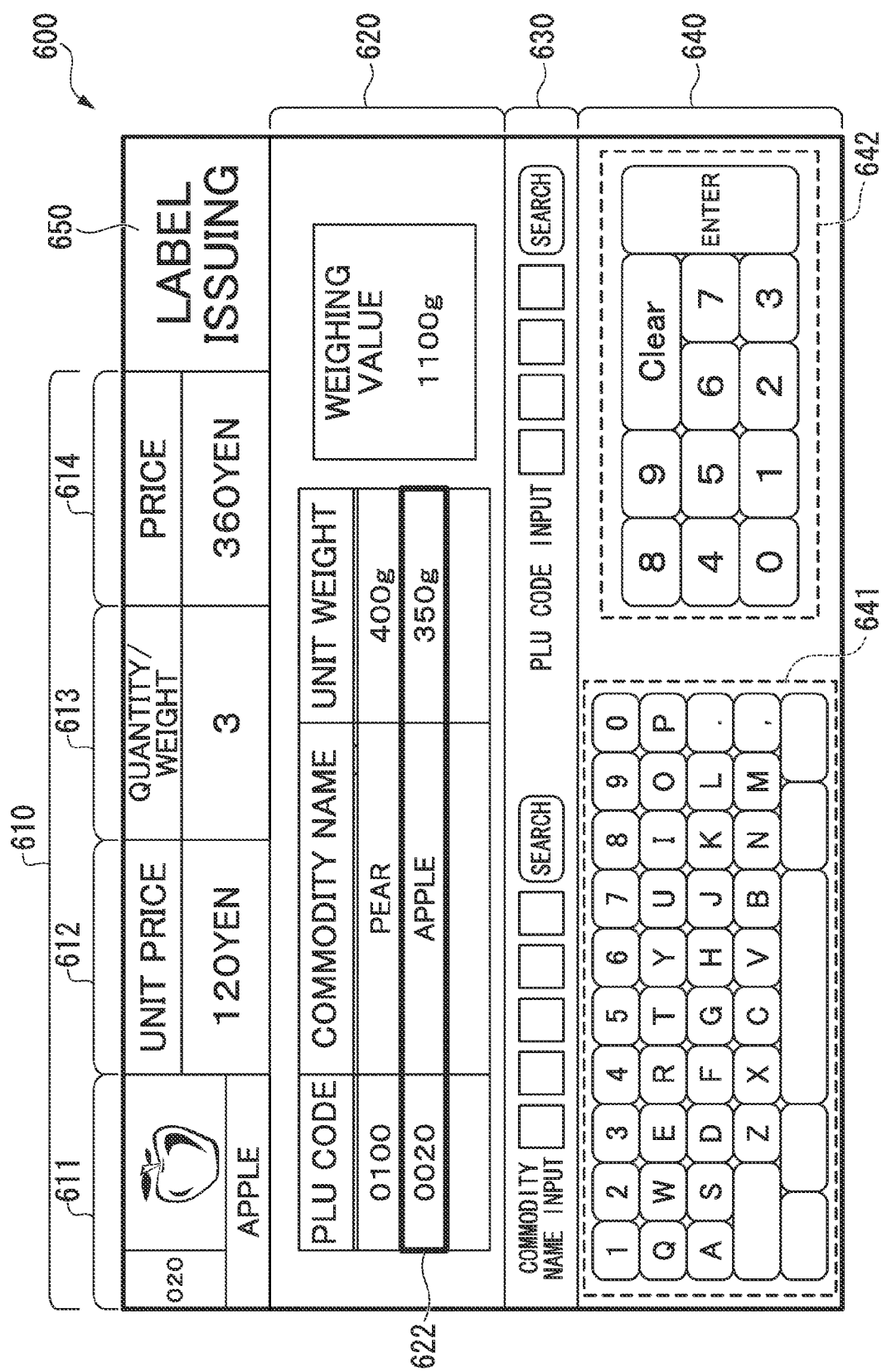
FIG. 11 is a diagram showing an example of a manipulation screen 600 in accordance with the modified example of the second embodiment of the present invention.

The manipulation screen 600 shown in FIG. 10 corresponds to a state for example, of waiting for the customer to perform a commodity selection manipulation after the commodity search process in the label-issuing device 100 has ended. In this example, when the customer places commodities on the scale stand 151 and inputs "3" as a commodity number, a "pear" and an "apple" are searched for, as shown. Also, the "pear" and the "apple" are arranged in this order from top to bottom in this list, which shows that the "pear" is searched for as a first candidate and the "apple" is searched for as the second candidate. In response thereto, a highlighted display frame 622 in the list is arranged in a position of the "pear," and information on the "pear" is displayed in the selected commodity information area 610.

Here, the commodities that the customer has actually placed on the scale stand 151 are assumed to be the apples. The customer performs, as a selection manipulation, a touch manipulation with respect to a row corresponding to the "apple" in the list in the commodity selection area 620. In response to this manipulation, the commodity "apple" is selected, and the manipulation screen 600 is shifted from the display shown in FIG. 10 to a display shown in FIG. 11. That is, the highlighted display frame 622 in the list of the commodity selection area 620 is moved from a position of the "pear" to a position of the "apple" and then displayed. Also, the selected commodity information area 610 is switched from a display of the information on "pear" to a display of the information on "apple." The customer confirms, for example, the display content shown in FIG. 11 and manipulates the label-issuing button 650.

Further, in the first embodiment, n commodities may be selected in order of commodities having the reference unit weight closer to the calculated unit average weighing value in the commodity search process. On the other hand, for example, a margin by predetermined upper and lower limits may be set for the reference unit weight, and a commodity whose unit average weighing value is within a range of the margin may be selected. In the second embodiment, even when a commodity is selected based on an approximation degree between the imaging commodity image and the captured image comparison data, the above scheme may be applied. Also, while a plurality of commodity candidates are presented as the result of the commodity search process in the first and second embodiments, one most similar commodity may be considered to be presented. In particular, since the second embodiment further uses the commodity search based on the captured image, high search accuracy can be expected. Accordingly, a probability of one commodity presented as the search result being a purchase target commodity is very high.

In the above embodiment, the commodity search device is applied to the label-issuing device 100 and is assumed as a device manipulated by the customer, but may be applied to, for example, a device that a clerk manipulates to perform pricing of a bagged commodity in a backyard of a store.

In the above-described embodiment, the scheme of searching for a commodity only from among commodities whose sale unit is set to the number-based sale has been adopted. However, as the weight-based sale, there are two types of sales in which commodities that can be counted (e.g., potato) are for weight-based sale rather than the number-based sale and a sale in which commodities difficult to count such as minced meat are for weight-based sale. That is, in the former case, the number of the commodities can be input even when the sale unit is the weight-based sale. In this case, the commodity search process based on the number input is performed on only a commodity whose reference unit weight has been set in the commodity database, such that the commodity search process is performed only on the commodity whose number can be input irrespective of whether it is the number-based sale or the weight-based sale. Thus, a faster commodity search process can be performed.

Further, in the above embodiment, when the total weight value obtained by weighing and a value of a product of the reference unit weight value stored in the commodity database 121 and the input number value exceed a certain range as the result of the commodity search process based on weighing, for example, when the product of the reference unit weight value and the input number value is twice the total weight value, a message confirming whether the input number value is erroneous may be displayed on the touch panel display unit. In this case, re-input of the number together with the message may be allowed and selection of other commodities may be allowed.

Accordingly, when the customer inputs a wrong number by mistake or fraudulently inputs a small number, it can be expected for the customer to input the correct number.

This can prevent a mistake or fraud in the number input with higher accuracy since the commodity search process based on the captured image comparison data is added in the second embodiment.

Further, it is more preferable to have a function of automatically correcting or updating the reference unit weight value stored in the commodity database 121 using an actually weighed unit average weighing value. For example, when the customer selects the commodity placed on the scale stand 151 from among the candidates specified through the search process and manipulates the label-issuing button 650, the reference unit weight value in the commodity database 121 is updated with the unit average weighing value. Accordingly, since the unit average weighing value of the commodity ultimately specified by the customer can be the reference unit weight value in the commodity database 121, it is possible to increase accuracy of weight-based search based on an actually measured value without a setting manipulation for data updating. Further, the function of correcting or updating the reference unit weight value is not limited to a scheme of updating with the latest value of the unit average weighing value, and may be an updating scheme in which a unit average weighing value corresponding to a certain number of times in the past stored in advance is used as the reference unit weight value.

Further, the procedures of the process described in the present embodiment may be recognized as a method including the series of procedures. Alternatively, the procedures may be recognized as program for causing a computer to execute a series of procedures or as a recording medium for storing the program. Examples of the recording medium may include a Blu-ray disc (registered trademark), a DVD (Digital Versatile Disk), an HDD (hard disk), a memory card, and the like.

According to the embodiments of the present invention, it is possible to provide a commodity search device and a commodity information processing device capable of easily specifying a commodity that is a purchase target without imposing an excessive manipulation burden on a customer.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A commodity search device comprising:
    a storage unit that stores commodity information including a reference unit weight determined for each commodity;
    a measuring unit that measures a total weight of commodities placed at a predetermined weighing position;
    a number input unit that allows inputting the number of the weighed commodities;
    a unit average weighing value calculator that divides the total weight of the commodities weighed by the measuring unit by the number input by the number input unit to calculate a unit average weighing value per one commodity; and
    a first commodity search unit that searches for commodities falling within a weight deviation from the storage unit using the unit average weighing value.

2. The commodity search device according to claim 1, wherein:
    the storage unit further stores optical characteristic data as the commodity information, and
    the commodity search device further comprises:
    an imaging unit that takes an optical image of the commodities placed at the weighing position and generates at least one of image data and color data of the commodities placed at the weighing position; and
    a second commodity search unit that searches for commodities having optical characteristic data that is the same as or similar to the optical characteristic data from only the commodities searched by the first commodity search unit, using the image or the color data.

3. The commodity search device according to claim 1, further comprising:
    a display that displays the searched commodity candidates; and
    a selection unit that selects one from among the commodity candidates displayed by the display, as the commodity placed at the weighing position.

4. The commodity search device according to claim 1, wherein:
    the first commodity search unit performs the search from only commodities whose unit weight value has been set.

5. The commodity search device according to claim 1, wherein:
    the storage unit further includes sale unit information indicating whether associated commodities are for number-based sale or for weight-based sale, and
    the first commodity search unit performs the search from only commodities whose sale unit information indicates the number-based sale.

6. The commodity search device according to claim 1, wherein:
    the reference unit weight value of the commodity information stored in the storage unit is corrected and a reference unit weight value associated with the commodities of the commodity information is updated using the unit average weighing value.

7. A commodity information processing device comprising the commodity search device according to claim 1, wherein:
    for the respective commodities of the commodity information, the commodities sold in a weight unit have a price per weight unit and the commodities sold in a number unit have a price per quantity unit, and a weight or a quantity of the commodities weighed by the measuring unit is multiplied by the unit price to calculate a price of the commodities weighed by the measuring unit.

* * * * *